United States Patent

Brady

[11] Patent Number: 6,000,009
[45] Date of Patent: Dec. 7, 1999

[54] METHOD AND APPARATUS FOR ALLOCATION OF DISK MEMORY SPACE FOR COMPRESSED DATA RECORDS

[75] Inventor: James T. Brady, San Jose, Calif.

[73] Assignee: International Business Machines Corporation, Armonk, N.Y.

[21] Appl. No.: 08/851,109

[22] Filed: May 6, 1997

[51] Int. Cl.[6] ............................ G06F 12/00; G06F 12/02; G06F 13/00

[52] U.S. Cl. ........................... 711/112; 710/68; 711/170; 711/171

[58] Field of Search .................................. 711/171, 100, 711/112, 114, 205, 120, 4, 172, 115, 170, 111, 104, 203; 710/66, 68, 65

[56] References Cited

U.S. PATENT DOCUMENTS

| | | | |
|---|---|---|---|
| 5,394,534 | 2/1995 | Kulakowski et al. | 395/425 |
| 5,644,791 | 7/1997 | Brady et al. | 395/888 |
| 5,649,151 | 7/1997 | Chu et al. | 395/438 |

*Primary Examiner*—Eddie P. Chan
*Assistant Examiner*—Kimberly McLean
*Attorney, Agent, or Firm*—Ohlandt, Greeley, Ruggiero & Perle

[57] ABSTRACT

A system and method allocates disk memory space for storage of compressed records and enables the compressed records to be stored in sequential physical positions on the disk memory space. The method and apparatus further assures a substantial likelihood that compressed, updated records will fit in the originally allocated physical positions during subsequent processing. The method comprises: compressing a record; determining a compression ratio (CR) value and a maximum run length (RL) of contiguous identical data segments in the uncompressed record; determining a corrected compression ratio (CCR) by repeating compression of the record without the RL of contiguous identical data segments included in the record; and if the CCR value is less than a historically experienced record compression ratio, employing the CCR value to allocate memory space for the compressed record. If CCR value equals or exceeds the ECR value, the ECR value is utilized to allocate memory space for the record.

8 Claims, 3 Drawing Sheets

METHOD AND APPARATUS FOR ALLOCATION OF DISK MEMORY SPACE FOR COMPRESSED DATA RECORDS

FIELD OF THE INVENTION

This invention relates generally to methods and apparatus for management of allocation of storage areas for compressed data and, more particularly, to a method and apparatus for allocation of memory space which assures a likelihood that compressed, updated data, upon recompression will fit into an originally allocated physical memory position.

BACKGROUND OF THE INVENTION

Data compression in disk arrays has, in the prior art, required the use of complex file systems, e.g., log-structured systems. A log-structured file system is a technique for disk storage management wherein all modifications to a disk are written sequentially to a log-like file structure. The log-like file structure contains indexing information so that stored files can be read back from the log in an efficient manner. An aspect of such log-structured arrays is that large free areas are maintained on the disk in order to speed-up the write process. To maintain the large free areas, the log is divided into segments, and a segment "cleaner" is employed to compress information from heavily fragmented segments, thereby freeing up segments for subsequent writes.

One such problem with log-structured arrays is that they result in a substantial diffusion of data storage regions across the disk, such that sequential data records become widely distributed across separated physical storage locations. Thus, when sequential accessing of data records is performed, overall disk performance suffers due to the large number of movements that are required to position and reposition read/write heads to accomplish the sequential data accesses.

As above indicated, in a log-structured disk controller that supports data compression, writes to disk are not written in place, but instead, are written to new locations on the disk that were previously empty. The disk controller divides the disk into segments, some of which are kept "empty". New writes from the system are written into sectors located within empty segments. As a result, each write or update data causes the data to be written to new physical locations, and the physical locations of the data are subsequently collected and reused for future writes.

In U.S. Pat. No. 5,574,952 to Brady et al. (and assigned the same Assignee as this application), an improved method for control of log structured data storage includes the steps of: allocating a first amount of disk space for a compressed data unit as a first predetermined percentage of an uncompressed size of the data unit; and then increasing the allocation by a second predetermined percentage that is less than the first predetermined percentage to obtain a total amount of allocated disk space. The first predetermined percentage is a function of an expected compression ratio for the data unit and the second predetermined percentage is a function of an expected compression ratio for the data unit and an expected change in the size of the compressed data unit. The method further, during an update operation, compares the size of a compressed updated data unit to the total amount of allocated disk space and if the size of the compressed updated data unit is equal to or less than the total amount of allocated disk space, the compressed updated data is stored therein. Otherwise, other disk space is allocated for storage of the compressed data unit.

The Brady et al. procedure described above, reduces the physical dispersion problem of data, but does not insure that data which is recorded to disk in compressed form is logically sequential in the initially allocated physical sequence on the disk. The teachings and disclosure of U.S. Pat. No. 5,574,952 are incorporated herein by reference.

U.S. Pat. No. 5,537,588 to Engelmann et al., assigned to the same Assignee as this Application, also describes a log-structured file system for partitioning of disk space. The method disclosed by Engelmann et al. includes the steps of partitioning the disk data storage system into multiple partitions, including first and second partitions. The first partition is managed as a log-structured file system for storage of segments that are comprised of active data units, each having an access activity value that exceeds a predetermined threshold. Within the second partition, data units are stored that are less active and exhibit an access activity value that is less than the first predetermined threshold.

U.S. Pat. No. 5,237,460 to Miller et al. discloses a disk storage allocation procedure wherein a disk memory is partitioned to provide a first memory space that contains a large number of memory locations of a first size that are capable of storing a compressed version of a block of data. A further partition is provided which includes a second memory space containing a large number of memory locations of a fixed size that are capable of storing an uncompressed version of a data block. When data blocks are received, they are compressed and it is then detected whether or not each compressed block is as small as a first size to fit within the first memory space. Thereafter, the compressed data blocks that fit within the first space are stored therein and those which do not fit are stored in the second data space in uncompressed form.

It is known in the art to spread data across large arrays of small inexpensive disks. Such a system is described by Patterson et al. in "Redundant Array of Inexpensive Disks (RAID)", ACM Sigmod Conference, Chicago, Ill., Jun. 1–3, 1988, pages 109–116. In a RAID structure, various arrangements of data segregation are described across multiple disk drives. It is desirable that any memory allocation procedure which accommodates compressed data be compatible with RAID organizations.

Accordingly, it is an object of this invention to provide an improved memory storage allocation method for compressed data.

It is another object of this invention to provide an improved memory storage allocation method and apparatus which assures a reasonable likelihood that physically sequential, initially allocated disk space will accommodate compressed, updated data records.

It is yet another object of this invention to provide an improved method and apparatus for allocation of compressed data across disk surfaces which is compatible with RAID organizations.

SUMMARY OF THE INVENTION

A system and method allocates disk memory space for storage of compressed records and enables the compressed records to be stored in sequential physical positions on the disk memory space. The method and apparatus further assures a substantial likelihood that compressed, updated records will fit in the originally allocated physical positions during subsequent processing. The method comprises: compressing a record; determining a compression ratio (CR) value and a maximum run length (RL) of contiguous identical data segments in the uncompressed record; determining a corrected compression ratio (CCR) by repeating compression of the record without the RL of contiguous identical data segments included in the record; and if the CCR value is less than a historically experienced record compression ratio, employing the CCR value to allocate memory space for the compressed record. If CCR value equals or exceeds the ECR value, the ECR value is utilized to allocate memory space for the record.

DETAILED DESCRIPTION OF THE INVENTION

It is to be understood that while, hereafter, the invention will be described in the context of the allocation of memory space on a magnetic disk surface, that the invention is equally applicable to any direct access storage device wherein data records are stored in tracks and are accessed by relative movement between a read/write transducer and a track.

Figure 1:
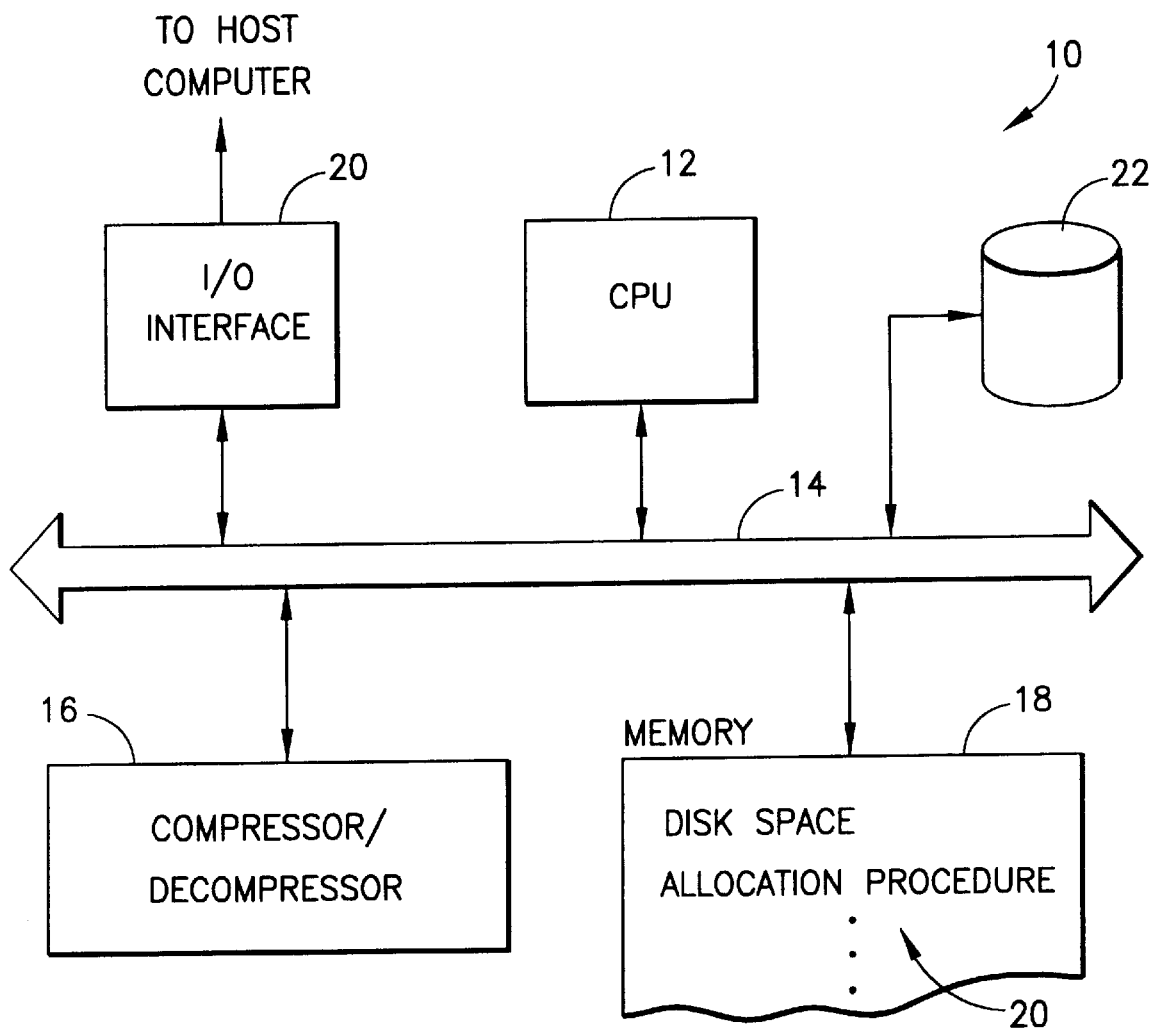
FIG. 1 is a block diagram illustrating a data processing system that is constructed and operated in accordance with this invention.

Referring to FIG. 1, a data processing system 10 is constructed and operated in accordance with this invention. System 10 includes a central processing unit (CPU) 12 which is coupled, by a bus system 14, to a data compressor/decompressor module 16 and a memory 18. An input/output (I/O) interface 20, provides data communications with a host processor (not shown). Within memory 18 is a disk space allocation procedure 20 (among others) which enables allocation of the disk space in a connected disk memory 22.

Hereafter, it will be understood that disk space allocation procedure 18 controls CPU 12 to allocate memory space on disk drive 22 so that logically sequential records, when stored in compressed form onto disk drive 22, are stored in physically contiguous locations, so as to enable sequential writes and reads to occur in minimal time. Such allocations accommodate potential increases in data size which might result from future data updates. To conserve disk drive space, compressor/decompressor 16 is employed and enables data records arriving through I/O interface 20 to be compressed for recording onto disk drive 22.

While a log structure is created by CPU-12 and is stored in RAM 18, the specific arrangement of the log structure is not directly relevant to this invention and will not be further considered. It is sufficient to state that the log maintains track of where various logical records can be found on disk drive 22, so as to enable subsequent access thereto.

It is a central feature of this invention that the allocation procedure, to be described below, allocates sufficient memory space to enable storage of a compressed data record and accommodates changes in size of the data record upon future updates, without requiring a change of physical location of the data record on the disk surface. While the method cannot assure, in all circumstances, that sufficient disk memory space will be available to accommodate all update situations—as that would be wasteful of disk space—it is a principal object of this invention to assure that, in most situations, sufficient disk space will be pre-allocated so as to accommodate changes in size of updated data records.

During the description of the disk space allocation procedure, certain parameters will be referred to that are hereafter defined:

Compression ratio (CR): is the ratio of size of an uncompressed data record to the compressed size of the data record. For instance, if a 4000 byte record compresses to 1000 bytes, CR=4.

Extra Space: this is the space added by the host processor's file system or data base system to leave room in the file's physical records for the additions of new logical records over time. Without extra space in the physical record space, a new logical record cannot be added without the use of complex pointers to overflow areas or a similar mechanism.

Pad: is a percent of a compressed record which is added to provide for expansion when the record is updated. Pad data normally comprises a run of zero's.

Maximum Run Length (RL): is a maximum length of contiguous identical bytes found in an uncompressed record.

Extent Size (ES): is the amount of contiguous space allocated to an uncompressed file and can include multiple records and can extend from a single track to multiple tracks.

Record Size (RS): the size of an uncompressed physical record, including any embedded, but unused space added to fill an allocated memory size (as contrasted to pad data which is provided for expansion space).

Compressed Record Size (CRS) is the size of a compressed record, including any embedded, but unused space added to fill an allocated memory size (as contrasted to pad data which is provided for expansion space).

Corrected Compression Ratio (CCR): is the ratio of a record size less the maximum run length data, to the record size divided by the compression ratio; or: (RS–RL)/(RS/CR).

Expected Compression Ratio (ECR): is the historically experienced compression ratio which is at least one previously experienced compression ratio.

Run Length Limit (RLL): is a percent of record size that is to be used to indicate that memory space should be temporarily allocated.

Limit: is the compression ratio (CR), below which fixed memory space is allocated.

In brief, the procedure of the invention accomplishes an initial allocation of memory space by allocating sequential space on a physical disk, based upon a run length parameter received from compressor 16 and the compression ratio. The method of the invention allows an allocation of space which will maintain sequential positions of the records, upon update. As a result, the method sacrifices a little of the potentially available data compression.

To accomplish the method, the compression ratio (CR) achieved as a result of an initial compression of a record is examined to determine if CR is less than a predetermined value (e.g. 5 or less). Such a result is interpreted as indicating that the number of contiguous, identical bytes counted in the RL is small enough to ignore. That is, the file system or database system has used up or did not allocate much extra space in the record and it can be ignored in the allocated space. In such a case, the maximum run length value therefrom is used to determine a corrected compression ratio (CCR) and a fixed allocation of memory space is made based upon the CCR. More specifically, by basing the memory space allocation on a relatively low CR value (and calculated CCR value), it is likely that the allocated space will be sufficient to accommodate subsequent updates.

By contrast, if the compression ratio is higher than the aforesaid limit value, the result is interpreted as being too good. That is, the data has compressed better than expected and the compression may be due to a presence of an excess of run length data (e.g., too many pad bytes). For instance, with commercial database data, a compression ratio of more than 5 is suspect. For machine code program files, the expected compression ratio will generally not exceed about 2.2. The system is accordingly primed with these values to set the Limit, based on the type of data being written to disk. If Cr is too high and is used for memory space allocation, it is likely that too little memory space will be allocated to accommodate future updates.

If, as stated above, the CR exceeds the Limit, the RL is examined and if it exceeds the run length limit percentage of the RS, the memory space is allocated on a variable basis, using the ECR. The reason the memory space is variably allocated is that the estimate of space may have too much risk in it because the amount of Extra Space in the record is so large as to make a calculation based on the CCR value unreliable.

When space that is variably allocated later receives update writes, the CR and RL are used to establish whether the variable allocation should now be converted to a fixed allocation. If yes, new space is allocated using the CCR value in the same manner as aforesaid.

Figure 2A:
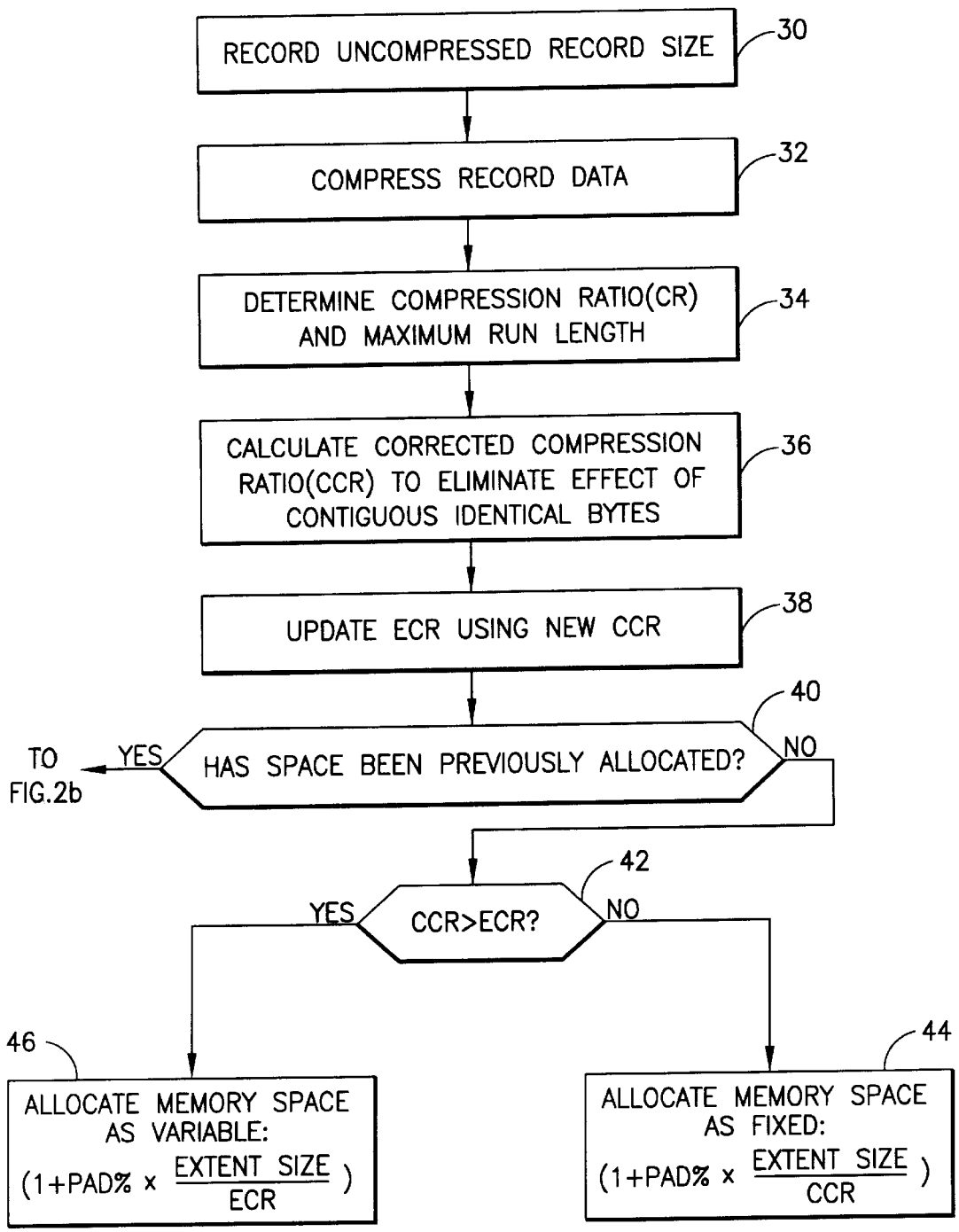
FIGS. 2a and 2b comprise a logical flow diagram which illustrates the disk space allocation procedure that is utilized by the system of FIG. 1.
Figure 2B:
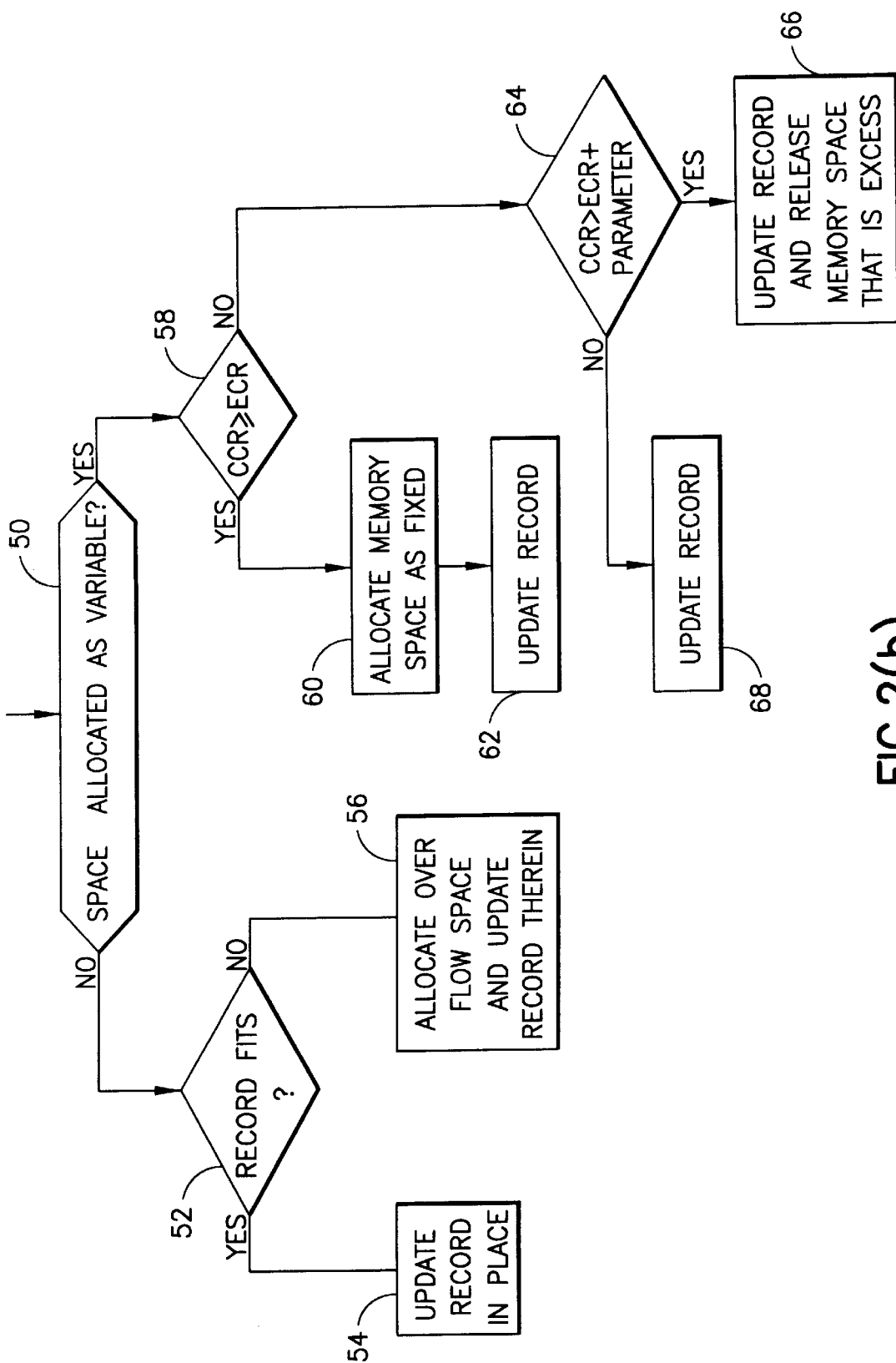

Turning now to FIGS. 2a and 2b, the detailed operation of the method of the invention will be described. Initially, the uncompressed Record Size (RS) is recorded (box 30) and then the record data is compressed (box 32). The compressor outputs the compression ratio (CR) and the maximum run length (RL) (box 34). Next, the corrected compression ratio (CCR) is calculated through use of the following expression (box 36):

$$CCR = CR*(RS-RL)/RS$$

Next, the historically experienced compression ratio (ECR) is updated, using the newly calculated CCR and, as will be understood is used as a parameter hereinbelow (box 38).

If memory space for the record has not been previously allocated (decision box 40), the CCR value is compared to ECR (decision box 40). If the CCR value is less than ECR, then it is assumed that a memory space allocation based on CCR will be sufficiently conservative to accommodate subsequent record updates. Accordingly, a fixed allocation of memory space (box 44) is calculated based upon the following expression:

(1+pad %)×Extent Size/CCR

The above expression indicates that the Extent Size, reduced by a factor based upon the corrected compression ratio and then expanded by the pad percentage, will be sufficient to provide a fixed allocation of memory space for the record. More specifically, that the allocation thus calculated will be sufficient to accommodate future updates to the record, without requiring a re-location of the physical record space.

If, by contrast, the CCR value is found to be greater than the ECR value (decision box 42), then the memory space is variably allocated (box 46) in accordance with the following expression:

(1+pad %)×Extent Size/ECR

The above expression indicates that the amount of temporarily allocated memory space is the Extent Size reduced by a factor equal to the historically experienced compression ratio, multiplied by the one plus the pad percentage. The variable allocation occurs due to the fact that the initial allocation of Extra Space may have been so large as to make the CCR value unreliable.

Returning to decision box 40, if memory space has been previously allocated, then a record update is occurring and the procedure moves to decision box 50 to determine whether the memory space has been allocated as fixed or variable. If memory space was allocated as fixed, it is next determined if the fixed record space will accommodate the updated record (decision box 52). If yes, the record is updated in place (box 54) and if no, overflow space is allocated and the updated record is placed therein, with a pointer being placed in the originally allocated space (box 56).

If memory space was variably allocated (decision box 50), a newly calculated CCR value for the updated record is compared to the ECR value (decision box 58). If CCR is found to be less than ECR, the memory space is re-allocated on a fixed basis (box 60) and the record is updated (box 62). If the newly calculated CCR value is found to be greater than or equal to ECR, the memory space remains variably allocated and it is next determined whether the CCR value exceeds ECR by a threshold amount (decision box 64). If yes, the variable allocation is reduced (makes unneeded memory available) while retaining enough memory space to store the compressed record and the record is updated (box 66). If no, the variable allocation is retained as is and the record is updated.

If an update write to a fixed allocated data space is thereafter experienced and the updated record will not fit in the allocated space, the updated record is written to a spill area and its location placed in a directory of records that are not in their home location. In addition, the home location is marked and a pointer to the spill area is placed in the record's home area. When a number of records have been "spilled", a garbage collection process is initiated which collects padding from records and tracks in the area surrounding the record, in order to obtain more space required to hold the new record and its padding. If sufficient padding cannot be acquired, then the Extent is reallocated to new physical space that is large enough to hold the data. This physical space should be contiguous, but may use more than one physically contiguous area. Finally, if the physical space becomes fragmented, one of a plurality of well-known defragmentation algorithms may be used to recover.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for allocating memory space for storage of compressed records which enables said compressed records to be stored in sequential physical positions in said memory space and assures a substantial likelihood that such records will fit in originally allocated physical positions during subsequent processing and modification, said method comprising the steps of:

a) compressing a record;

b) determining a compression ratio (CR) which results from step a) and a maximum run length (RL) of contiguous data segments in an uncompressed version of said record;

c) determining a corrected compression ratio (CCR) by repeating step a) without said RL included in said record;

d) if the CCR is less than a predetermined expected compression ratio (ECR) wherein the ECR is at least one previously experienced compression ratio, employing said CCR to allocate memory space for said record compressed in step a) and e) if the CCR equals or exceeds said ECR, employing said ECR to allocate memory space for said record compressed in step a).

2. The method as recited in claim 1, comprising the further steps of:

f) upon a subsequent update to said record, determining a corrected compression ratio (CCR) for said updated record; and g) if the CCR determined in step f) is less than an ECR value, allocating as fixed said variably allocated memory space for said record and updating said record.

3. The method as recited in claim 1, wherein said ECR value is an average which takes into consideration, historically experienced compression ratios.

4. The method as recited in claim 2, comprising the further steps of:

f) if the CCR value determined in step b) is equal to or greater than said ECR value, releasing an excess amount of memory space from an amount of memory space previously allocated for said record.

5. A memory media for controlling a computer to allocate disk memory space for storage of compressed records to enable said compressed records to be stored in sequential physical positions on said disk memory space and to assure a substantial likelihood that such records will fit in originally allocated physical positions during subsequent processing and modification, said memory media comprising:

a) means for controlling said computer to compress a record;

b) means for controlling said computer to determine a compression ratio (CR) value which results from means a) and a maximum run length (RL) of contiguous data segments in an uncompressed version of said record;

c) means for controlling said computer to determine a corrected compression ratio (CCR) value by repeating the operation of means a) without said RL of contiguous data segments included in said record;

d) means for controlling said computer to employ said CCR to allocate disk memory space for said record compressed by means a) if the CCR value is less than a predetermined expected compression ratio (ECR) wherein the ECR is at least one previously experienced compression ratio; and e) means responsive to the CCR value equaling or exceeding said ECR, for controlling said computer to employ said ECR value to allocate memory space for said record compressed by means a).

6. The memory media as recited in claim 5, further comprising:

f) means for controlling said computer to respond to a subsequent update to said record, to determine a corrected compression ratio (CCR) for said updated record; and h) means for controlling said computer to respond to the CCR being less than said ECR value, to allocate as fixed said reallocated disk memory space for said record.

7. The memory media as recited in claim 5, wherein said ECR value is an average of historically experienced compression ratios.

8. The memory media as recited in claim 5, further comprising:

g) means for controlling said computer to respond to the CCR value determined in step b) being equal to or greater than said ECR value, to release an excess amount of memory space from an amount of memory space previously allocated for said record.

* * * * *